United States Patent [19]

Francioni

[11] Patent Number: 5,263,568
[45] Date of Patent: * Nov. 23, 1993

[54] DEVICE FOR TRANSPORTING ARTICLES, PARTICULARLY FOR AUTOMATIC PACKAGING PLANTS

[75] Inventor: Renzo Francioni, Prato Sesia, Italy

[73] Assignee: Cavanna S.p.A., Prato Sesia, Italy

[*] Notice: The portion of the term of this patent subsequent to May 19, 2009 has been disclaimed.

[21] Appl. No.: 857,992

[22] Filed: Mar. 26, 1992

[30] Foreign Application Priority Data

Jun. 20, 1991 [IT] Italy .................. T091A000471

[51] Int. Cl.⁵ .............................................. B65G 47/26
[52] U.S. Cl. ................................. 198/419.2; 198/419.3
[58] Field of Search ............... 198/419.2, 419.3, 479.1, 198/480.1, 457, 723, 732; 53/534

[56] References Cited

U.S. PATENT DOCUMENTS

| | | | |
|---|---|---|---|
| 2,362,132 | 11/1944 | Haub | 198/22 |
| 3,899,069 | 8/1975 | Heinzer | 198/25 |
| 4,239,116 | 12/1980 | Eisenberg et al. | 209/523 |
| 4,619,357 | 10/1986 | Radzins et al. | 198/479.1 |
| 4,733,518 | 3/1988 | Griesdorn | 53/534 |
| 4,998,399 | 3/1991 | Lutzke et al. | 198/419.3 |
| 5,113,996 | 5/1992 | Francioni | 198/723 |

FOREIGN PATENT DOCUMENTS

| | | |
|---|---|---|
| 2937115 | 4/1980 | Fed. Rep. of Germany . |
| 939552 | 10/1963 | United Kingdom . |
| 2022538 | 12/1979 | United Kingdom . |
| 2061213 | 5/1981 | United Kingdom . |
| 2065055 | 6/1981 | United Kingdom . |

Primary Examiner—Joseph E. Valenza
Attorney, Agent, or Firm—Evenson, McKeown, Edwards & Lenahan

[57] ABSTRACT

A device for transporting articles includes a carousel structure which picks up individual articles from an input conveyor and then entrains them along a generally arcuate path towards an output conveyor. The output conveyor is formed so as to advance the articles in groups each including a predetermined number of adjacent articles. The entrainment members of the carousel structure preferably relinquish the articles before they reach the output conveyor so that the articles accumulate immediately upstream of the output conveyor.

9 Claims, 1 Drawing Sheet

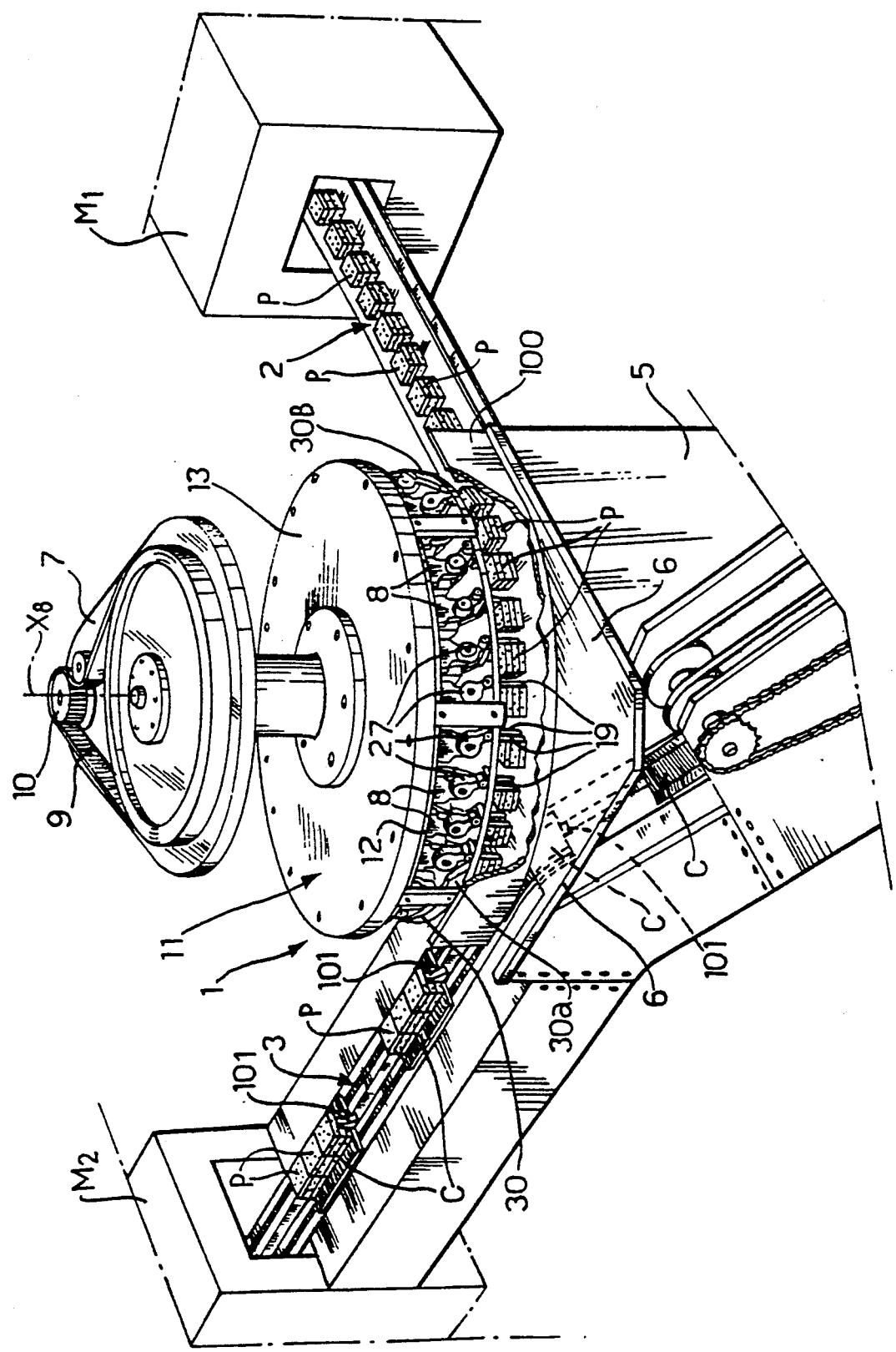

DEVICE FOR TRANSPORTING ARTICLES, PARTICULARLY FOR AUTOMATIC PACKAGING PLANTS

DESCRIPTION

The present invention relates to devices for transporting articles and has been developed with particular attention to its possible use in the field of automatic packaging plants for articles such as food products, etc.

Such plants usually have several stations arranged in cascade for carrying out successive handling operations on a substantially continuous flow of articles transported on belts and similar conveyor devices.

In this connection (see, for example, patent application 666669 in the name of the present applicant) it is known to transport articles by means of a device including a carousel structure with entrainment members which can move to the articles along a generally arcuate path between an angular input position and at least one angular output position. At the output position, the entrainment members are usually lifted from the surface on which the articles slide, leaving the articles free to be transferred onto at least one further output conveyor for transportation.

The device can thus modify the path along which the articles are advanced either by imparting a curved or elbowed shape to the flow of articles or by dividing an input flow into one or more branch flows which are not necessarily identical.

In many situations of use, a need arises to arrange for a flow of individual articles—that is, articles advancing in a continuous or substantially continuous flow in which each article is separated from the two adjacent articles in the flow (that is, the articles upstream and downstream) by a predetermined distance—to be transformed into a flow of groups of articles, that is, a flow in which each article advances close to or substantially close to at least one other article.

For clarity, it should also be noted that the articles in question, taken individually, may be composite in nature; in fact, each article may actually be constituted, for example, by a pile of products, for example, a pile of superposed biscuits.

The object of the present invention is essentially to provide a device which, for example, can transform a flow of individual articles into a flow of groups of articles. According to the present invention, this object is achieved by virtue of a device having the characteristics claimed specifically in the following claims.

The invention will now be described, purely by way of non-limiting example, with reference to the appended drawing which is a perspective view of a device according to the invention.

In the drawing, a device, generally indicated 1, for transporting articles P is intended to be used, for example, in an automatic packaging plant for food products. In the specific example, the articles P are constituted by piles of stacked biscuits, such as rusks.

The device 1 may be intended, for example, to pick up the articles P coming from a "source" handling station $M_1$ (constituted, for example, by the output stage of an oven in which the individual biscuits which have been baked are superposed to form the piles P) in order to send the articles, according to criteria which will be described further below, to a handling station $M_2$ situated downstream of the source station $M_1$ and of the device 1 in the direction of flow of the articles P.

The station $M_2$ may be constituted, for example, by a wrapping or packaging machine which is to be supplied not with the flow of individual products P, but with a flow in which the articles P are collected in groups, each group being formed, for example, by three products P close together.

In general, the articles P are supplied to the device 1 (which, as will become clearer from the following, has a generally carousel-like structure) in a first angular position (the angular input position) on an input conveyor 2 (a belt or the like) which extends and advances the products P in a direction generally tangential to the device 1.

The articles P are discharged from the device 1 onto a respective output conveyor 3 (also a belt or the like) which extends towards the output station M2 from the device 1, in a direction tangential thereto, in a respective angular position (the angular output position—which, by way of example, is shown spaced from the angular input position by about 90°).

The device 1 is composed essentially of a base 5 on which a horizontal plate 6 is mounted at a height corresponding to the height of the surfaces on which the articles P advance on the conveyors 2 and 3 so as to form a sliding surface for the articles P transferred.

A rotary carousel-like structure, mounted on the sliding surface 6 and supported by a bracket-like support 7 which projects upwardly from the base 5, is constituted by a plurality of transfer members 8, the lower end of each of which has a fork unit 19 which, in the embodiment illustrated, includes two prongs.

The carousel structure is rotated (clockwise, with reference to the drawing) about a vertical axis $X_8$ by means of a belt transmission 9 driven by a vertical shaft 10. The shaft 10 extends within the vertical upright of the bracket element 7 and is rotated by a motor which is situated in the base 5 and is therefore not visible in the drawings.

The carousel structure, including the members 8 is mounted physically within a cage 11 which is also circular or annular and is supported by the bracket 7.

In practice, the upper ends of the transfer members 8 are fixed (bolted) to a disc or plate 12, only the edge of which can be seen in the drawing, since it is completely hidden by the plate 13 which closes the cage 11 at the top.

The fork units 19 are mounted on the members 8 in a manner such that they can move generally vertically, that is, away from and towards the base plate 6 on which the articles P slide.

This may be achieved, for example, by the mounting of the fork units 19 in respective vertical sliding guides bolted to the plate 12 and the association of drive means such as, for example, electromagnetic or pneumatic actuators or electric motors, therewith.

In the embodiment to which the present description refers—by way of example—(and according to a solution based substantially on that described in the prior application 666669 mentioned above) the fork units 19 are mounted on the members 8 by a generally articulated-parallelogram-like structure with respective levers 27 which project outwardly from the device 1. The free end of each lever (on which a bearing is normally mounted) is intended to cooperate with a cam 30 outside the circular path of movement of the transfer members 8 and, in particular, the levers 27.

In the embodiment illustrated, the cam 30 takes the form of a circumferential band which extends around the entire periphery of the cage structure except for the portion between the angular input position for the articles P (the position at which the input belt 2 arrives) and the angular output position (the position of the conveyor 3). The cam 30 is absent in this portion.

The height of the cam 30 is selected so that, when the lever 27 of a member 8 (or, more specifically, the bearing which is mounted on its free end and acts as a cam follower) cooperates with the cam 30 by rolling thereon, the lever 27 is kept in a raised position and consequently lifts the respective fork unit 19 from the surface 6. In the portion in which the cam 30 is absent, the levers 27 (and the fork units 19 operated thereby) are therefore lowered (by gravity, possibly with the aid of resilient biasing means not visible in the drawings) so as to move the fork units 19 towards the surface 6. Naturally, the transition between the region with the cam 30 and the angular region in which it is absent is not abrupt but gradual; in particular, the cam has two inclined end edges or sides, a rising or input edge 30a (in correspondence with the angular output position for the articles P) and a descending or output edge 30b (in correspondence with the angular input position for the articles P).

Thus, the arrangement is such that, as the carousel structure rotates, the fork units 19 approach the input angular position for the articles P in raised positions and then descend, as a result of the sliding of their levers along the output or descending edge 30b of the cam 30, so that each is disposed behind a respective article P coming from the belt 2. At this point, the fork unit 19 can entrain the respective article P positively and slide it on the plate 6 towards the angular output position. In order to prevent the articles P from slipping outwardly on the plate 6, the fork units 19 may have formations for retaining the articles P radially. Alternatively, according to the specific embodiment to which the drawing relates, an arcuate guide 100 may be mounted along the envisaged path of movement of the articles P on the plate 6, the guide extending (at least) along the outer side of the expected sliding path of the articles P from the angular input position to the angular output position.

In correspondence with the angular output position, each fork unit is lifted as a result of the sliding of its lever 27 against the input or rising edge 30a of the cam 30, so as to relinquish its product P which is thus taken over by the output conveyor 3.

In general, the active pass of the conveyor 3 (that is, its upper pass which is intended to transport the articles P positively towards the user station $M_2$), emerges or rises from below the plate P to a position in which it is coplanar therewith. Moreover, packaging elements such as cards C are loaded beforehand onto the conveyor 3 by a handling station (not shown) upstream of the device 1, each card C being intended to receive a certain number of articles P (in the embodiment shown, three piles of biscuits P grouped together).

An important characteristic of the solution according to the invention is the different natures of the input conveyor 2 and the output conveyor 3.

In particular, the two conveyors in question can transport different groups of articles.

In the specific embodiment described, the input conveyor 2 is a belt conveyor on which the articles P travel, arranged in a flow of individual articles. The output conveyor 3, however, is a chain conveyor with entrainment nibs or dogs 101 the distance between which is selected in dependence on the number of articles P to be included in each group constituting the output flow.

For example, in the embodiment illustrated, the distance between the nibs 101 of the output conveyor 3 is selected so as to be slightly greater than the length of three successive articles P (measured in the direction of advance of the output flow of articles).

Naturally, the solution illustrated by way of non-limiting example, is only one of many possible solutions. For example, the output conveyor 3 could be formed so as to entrain the articles in groups of, for example, five articles.

In particular, the fork units 19 could be arranged to rise in correspondence with the angular output position as a result of the cooperation of their levers 27 with the input edge 30a of the cam 30 so as to relinquish the articles P a certain distance from the upstream end of the active entrainment pass of the conveyor 3, that is, the end where the conveyor rises to a position in which it is coplanar with the plate 6.

This would mean that each article P would not be able to advance by itself towards the output station $M_2$ as soon as it had been relinquished by its fork unit 19. In these circumstances, the article P can be brought to a position facing the active pass of the conveyor 3 for entrainment thereby only when a following article P, brought to the output position by a respective fork 19 which has also moved away upwardly, arrives against the article in question and urges it forwards. The gathering together or accumulation of successive articles P, on which the formation of the aforementioned groups is based, can thus be achieved. By increasing the distance between the input edge of the conveyor 3 and the angular position in which the forks 19 are lifted away from the respective articles P, the mechanism by which the products P are sent towards the conveyor 3 can be arranged so as to take effect only as a result of the thrust exerted by a further following article P in the row being transferred and not by the immediately following article. The accumulation effect can thus be extended further.

Instead of being withdrawn by the output conveyor 3 as a result of the penetration of the nibs 101 from below, the products P could be withdrawn in a completely different manner, for example, with the use of a conveyor with nibs 101 which penetrate the device radially. From various points of view, and as regards the overall bulk of the machine, however, penetration from below seems preferable.

What is claimed is:

1. A device for converting an input flow of articles into an output flow in which the articles are arranged in groups of adjacent articles, each group including a predetermined number of articles, wherein said device includes:

a carousel structure which can move the incoming articles along a generally arcuate path between an angular input position and at least one output angular position, the carousel structure including entrainment members which can engage the articles for entrainment in correspondence with the angular input position and release the articles in correspondence with the angular output position; and output conveyor means extending from the angular output position and having respective formations for entraining the articles, the distance between the formations being no less than the length of the predetermined number of articles measured in the direction of advance of the output flow of articles, wherein the entrainment members have fork units which can engage the articles in correspondence with the angular input position as a result of a general downward movement from above and can then release the articles as a result of an upward movement in correspondence with the angular output position.

2. A device for converting an input flow of articles into an output flow in which the articles are arranged in groups of adjacent articles, each group including a predetermined number of articles, wherein said device includes:

a carousel structure which can move the incoming articles along a generally arcuate path between an angular input position and at least one output angular position, the carousel structure including entrainment members which can engage the articles for entrainment in correspondence with the angular input position and release the articles in correspondence with the angular output position;

a plate for sliding the articles which are entrained between the angular input position and the angular output position; and output conveyor means extending from the angular output position and having respective formations for entraining the articles, the distance between the formations being no less than the length of the predetermined number of articles measured in the direction of advance of the output flow of articles, wherein the output conveyor means has an active pass, for transporting the articles, which emerges gradually from below the plate to a position wherein the output conveyor is substantially coplanar with the plate.

3. A device according to claim 1, wherein it includes cam means for operating the entrainment members.

4. A device according to claim 3, wherein respective operating levers are associated with the entrainment members and the carousel structure carries at least one peripheral cam for cooperating with the operating levers in at least one of the angular portions of the path of rotation of the carousel structure between the angular input position and the angular output position.

5. A device according to claim 4, wherein the peripheral cam extends along the angular portion of the path of rotation of the carousel structure which extends from the angular output position to the angular input position, in the sense of rotation of the carousel.

6. A device according to claim 2, wherein it includes a plate on which the articles which are entrained between the angular input position and the angular output position can slide, and means for restraining the articles laterally during their entrainment on the plate between the angular input position and the angular output position.

7. A device according to claim 2, wherein it includes input conveyor means which supply the articles to the angular input position in a direction substantially tangential to the carousel structure.

8. A device according to claim 2, wherein the output conveyor means extend from the angular output position in a direction substantially tangential to the carousel structure.

9. A device according to claim 2, wherein the output conveyor means have an upstream end for receiving articles a certain distance downstream from the position in which the entrainment members release the articles, the arrangement being such that, once each individual article has been released by its entrainment member, it can reach the output conveyor means for transportation only as a result of the thrust exerted by at least one article which follows it in the flow and has been relinquished in turn by its entrainment member.

* * * * *